Jan. 30, 1940.        B. C. ROEHRL              2,188,779
              SELF-SEALING FILM ROLL FOR CAMERAS
              Filed Jan. 5, 1938       2 Sheets-Sheet 1
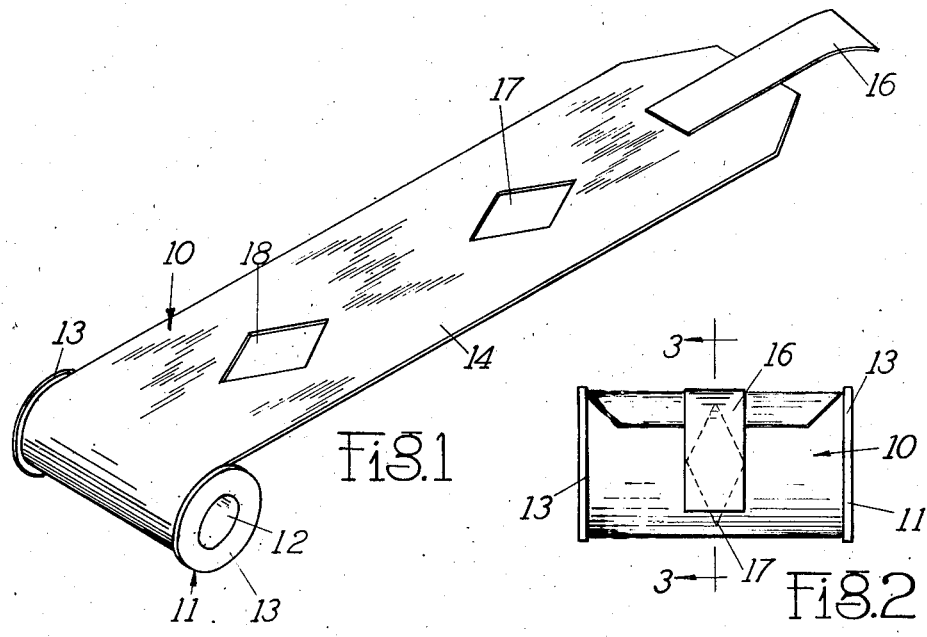
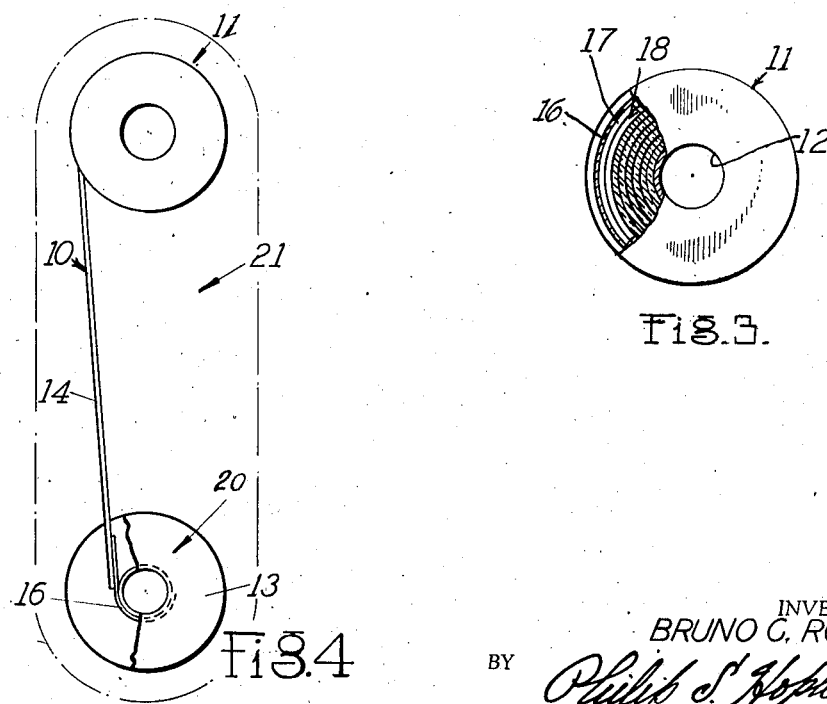
INVENTOR.
BRUNO C. ROEHRL
BY
ATTORNEY.

Jan. 30, 1940.  B. C. ROEHRL  2,188,779
SELF-SEALING FILM ROLL FOR CAMERAS
Filed Jan. 5, 1938  2 Sheets-Sheet 2
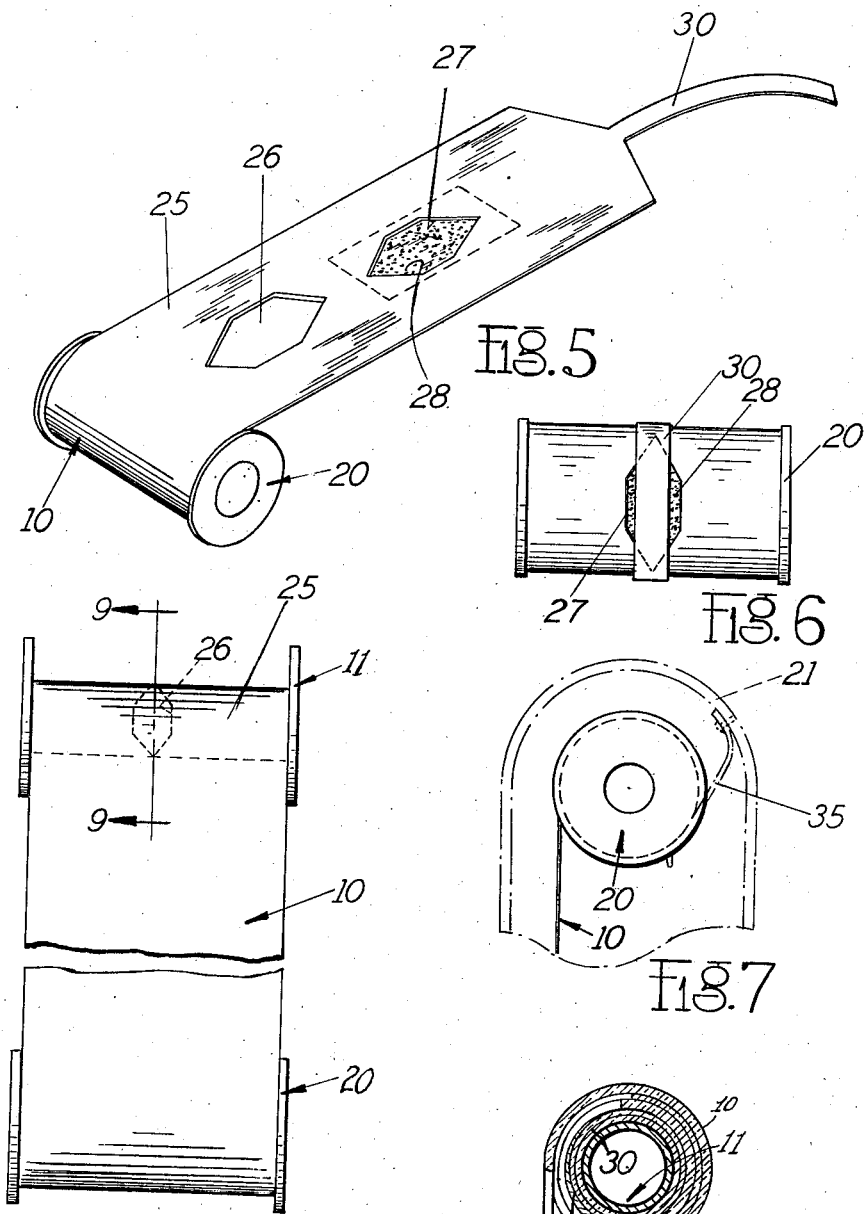
INVENTOR.
BRUNO C. ROEHRL
BY
ATTORNEY.

Patented Jan. 30, 1940

2,188,779

UNITED STATES PATENT OFFICE 2,188,779

SELF-SEALING FILM ROLL FOR CAMERAS

Bruno C. Roehrl, Binghamton, N. Y., assignor, by mesne assignments, to Agfa Ansco Corporation, Binghamton, N. Y., a corporation of Delaware Application January 5, 1938, Serial No. 183,502

5 Claims. (Cl. 95—9)

This invention relates to a self-sealing film roll for cameras.

A primary object of this invention is the provision of a film roll which is self-sealing; that is a film roll which, when removed from the camera after exposure, is sealed against the entrance of light without the necessity of any operation by the user of the film save the removal thereof from the camera.

It is a further object of this invention to provide a self-sealing film roll of the character to be hereinafter described which is relatively simple and inexpensive to manufacture and reliable and simple in operation.

As conducive to a clearer understanding of this invention, it may here be pointed out that film rolls containing exposed or unexposed film prior to development are, as is well known, ruined by exposure to light. If such films are taken from the camera in a rolled but unsealed condition, it frequently happens that the roll becomes loosened sufficiently during, or prior to, this operation to permit ingress of light to the film and consequent destruction of one or more of the negatives. An object of this invention is, therefore, to provide a film roll which may be removed from the camera outside of a dark room in sealed condition, whereby regardless of the light or lack of light, damage to the film by exposure to light is precluded.

Other objects will in part be obvious and in part be pointed out hereinafter.

The invention accordingly consists in the combinations of elements, arrangements of parts and features of construction all as will be more fully pointed out hereinafter and disclosed in the accompanying drawings wherein:

Figure 1 is a perspective view of a film, having one end of the protective paper backing thereof unrolled, embodying a part of this invention, Figure 2 is a side elevational view of a roll of film as delivered to the user for use in a camera, Figure 3 is an enlarged sectional view taken along the line 3—3 of Figure 2 as viewed from the right, Figure 4 is a side elevational view of the position a film roll embodying this invention assumes when positioned in a camera, showing the method of securing an end thereof to the film spool, Figure 5 is a view similar to Figure 1 but showing the opposite end of the film roll in extended position, Figure 6 is a side elevational view of a roll of film after use and removal from a camera, Figure 7 is a detail view disclosing a portion of a camera which, utilized with the film comprising the instant invention, serves to assist in sealing the same, Figure 8 is an elevational view of the film in the position it assumes in the camera part way through the use thereof, and Figure 9 is an enlarged sectional view taken along the line 9—9 of Figure 8 as viewed from the right.

Similar reference characters refer to similar parts throughout the several views of the drawings.

Referring now to Figures 1 and 2 there is generally indicated at 10 a roll of film adapted when supplied by the manufacturer to take the form shown in Figure 2, that is, wound about a spool generally indicated at 11, comprised of a core 12 (see Figure 3) and a pair of end portions 13. The outer end of film roll 10 is comprised of a paper backing strip 14 which is provided at its extreme end with a strip of dry adhesive 16; that is self-sealing adhesive which requires only slight pressure in dry condition to form a seal with the medium with which it comes in contact.

A pair of apertures 17 and 18 are provided in paper backing strip 14. Apertures 17 and 18 may be of any desired configuration but in practice it has been found preferable to make them of angular shape having tapered portions extending in the direction of adhesive 16 for a purpose to be described hereinafter. Apertures 17 and 18 are positioned a distance apart such as to insure their registry when the backing strip 14 is in the rolled position shown in Figure 2. Thus, as best shown in Figure 3, with apertures 17 and 18 in aligned relation when adhesive 16 is wound about the roll (as best shown in Figure 2) a central portion of adhesive 16 of substantially diamond shape remains out of contact with the underlying portion of backing strip 14, being so held by the thickness of the paper adjacent apertures 17 and 18. Such adhesive, however, engages that portion of backing strip 14 adjacent the edges of aperture 17 to insure a relatively tight sealing therefor. When it is desired to position the film in the camera, adhesive 16 is merely pressed upon the core of a spool 20 similar in all respects to spool 11. Spool 20, which is adapted for insertion in a camera, a fragment of the wall of which is generally indicated at 21 in Figure 4, is then wound in the conventional manner until the sensitized film of the roll is opposite the lens of the camera.

From the foregoing the method of assembly of the film with respect to the camera should be readily understood.

Having reference now to Figure 5 there is shown the trailing end of film roll 10 after the same has been completely used and wound upon spool 20. Trailing end 25 is comprised of the opposite end 25 of the paper backing strip and is provided with two apertures 26 and 27 one of which, 27, has secured to the underside thereof a sheet of dry adhesive 28. Aperture 26 is of larger dimension than aperture 27 and apertures 26 and 27 are spaced apart a distance less than the spacing of apertures 17 and 18 whereby they may be in registry with each other as the paper is wound upon the shaft 12 of spool 11. The arrangement therefor is such that there are two thicknesses of paper backing strip each containing an aperture, 26 and 27, adjacent adhesive 28 and the combined depth of the aperture as defined by the double thickness of paper precludes contact of the next coil of the paper backing strip with adhesive 28 (see Figure 9). The trailing end 25 of the backing strip is provided with a relatively long centrally disposed extension 30. This extension 30 may be integral with the end 25 or a separate adhesive strip attached thereto. When the film is assembled by the manufacturer extension 30 is first wound about core 12 of spool 11 and the paper backing strip and the film subsequently wound, dry adhesive 28 being protected as hereinbefore described, and the film sealed by the manufacturer as previously described.

When the film has been completely exposed, however, and it is desired to remove the same from the camera for development, additional rotation of the film winding means associated with the camera will result in extension 30 being disengaged from roll 11 and wound tightly about roll 20. A resilient spring 35 (see Figure 7) secured in any desired manner to camera casing 21 serves to insure relatively tight winding of film 10 in a known manner, but, being centrally positioned with respect to film 10, serves also to impress extension 30 against adhesive 28 in such manner as to effect a relatively tight seal of the rolled film and preclude the possibility of the same being loosened to admit light thereto when it is removed from the camera.

Thus it will be seen that by means of the instant invention a roll of film may be inserted in a camera, the camera closed, the film exposed, rerolled and sealed without the necessity of opening the camera at any time prior to the sealing, thus precluding the possibility of damage to the film by inadvertent or accidental exposure to light.

It will, therefore, be seen that there is herein provided a structure accomplishing all the objects of this invention and others including many advantages of great practical utility.

As many embodiments may be made of the above described inventive concept and as many modifications may be made in the embodiment herein shown and described, it is to be understood that all matter hereinbefore set forth or shown in the accompanying drawings is to be interpreted merely as illustrative and not in a limiting sense.

I claim as my invention:

1. A film roll for a camera comprising means forming a part thereof for sealing the same after use and prior to removal of the film from the camera, said film having an opening in the trailing end thereof, said sealing means comprising a strip of adhesive positioned on the inner side of said film with its adhesive surface overlying said opening, said opening protecting the adhesive from contact with the next convolution of the roll, and said adhesive surface being engageable through the opening by the end of said film roll for sealing the same when said roll is wound for removal from the camera.

2. A film roll for a camera comprising means forming a part thereof for sealing the same after use and prior to removal thereof from a camera, said means comprising a strip of adhesive carried by the trailing end of aid film roll and adapted to seal said roll when the same is wound for removal from said camera and means for protecting said adhesive from contact with said roll, prior to the complete winding thereof through the camera, said means comprising an aperture in the trailing end of said film roll, said aperture being of a dimension to overlie a portion of said adhesive and the thickness of said trailing end around said aperture serving to preclude contact of the next succeeding convolution with said adhesive.

3. A film roll for a camera comprising means forming a part thereof for sealing the same after use and prior to removal thereof from a camera, said means comprising a strip of adhesive carried by the trailing end of said film roll and adapted to seal said roll when the same is wound for removal from said camera and means for protecting said adhesive from contact with said film roll prior to the complete winding thereof through the camera, said means comprising an aperture in the trailing end of said film roll, said aperture being of a dimension to underlie and protect a portion of said adhesive and the thickness of said trailing end around said aperture serving to preclude contact of the next succeeding convolution with said adhesive and an extension strip of a dimension less than the width of said aperture adapted to be wound about said roll and engaged with said adhesive through said aperture to seal said film roll.

4. A film roll for a camera, comprising in combination, a leading end having an opening therein, a trailing end also having an opening therein, adhesive means for securing said leading end in rolled position, a portion of said adhesive means overlying said leading end opening when said film is rolled whereby said portion does not contact the next convolution of the roll, and additional adhesive means for securing said trailing end in rolled position after use, said additional adhesive means being positioned on said film facing said trailing end opening whereby said additional adhesive means does not contact the next convolution of the roll prior to the complete winding thereof through the camera, said additional adhesive means being engageable through the opening by the end of said film roll for sealing the same when said roll is wound for removal from the camera.

5. A film roll comprising in combination, a leading end, adhesive means secured thereto for securing the same in rolled position, a trailing end, adhesive means secured thereto for securing the same in rolled position after use and means for protecting a portion of both said adhesive means from contact with said film until utilized, said means comprising apertures adjacent each of said adhesive means and so positioned that when said film is rolled the segment of said film containing said apertures overlie said adhesive to protect the same from contact with the next succeeding convolution.

BRUNO C. ROEHRL.